US012212804B2

(12) United States Patent
Hogeg et al.

(10) Patent No.: US 12,212,804 B2
(45) Date of Patent: Jan. 28, 2025

(54) PROVIDING VISUAL CONTENT EDITING FUNCTIONS

(71) Applicant: Snap Inc., Santa Monica, CA (US)

(72) Inventors: Moshe Hogeg, Meitar (IL); Yosef Shemesh, Tel Aviv (IL)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/358,541

(22) Filed: Jul. 25, 2023

(65) Prior Publication Data

US 2023/0370673 A1 Nov. 16, 2023

Related U.S. Application Data

(63) Continuation of application No. 17/879,424, filed on Aug. 2, 2022, now Pat. No. 11,750,875, which is a (Continued)

(51) Int. Cl.
*G06F 40/30* (2020.01)
*G06F 3/0482* (2013.01)
(Continued)

(52) U.S. Cl.
CPC ....... *H04N 21/4312* (2013.01); *G06F 3/0482* (2013.01); *G06F 3/04845* (2013.01); (Continued)

(58) Field of Classification Search
CPC ...... H04N 21/4312; H04N 23/63; H04N 5/44; H04N 21/23418; H04N 21/41407; (Continued)

(56) References Cited

U.S. PATENT DOCUMENTS 666,223 A 1/1901 Shedlock
4,555,775 A 11/1985 Pike
(Continued)

FOREIGN PATENT DOCUMENTS

CA 2887596 A1 7/2015
EP 2051480 A1 4/2009
(Continued)

OTHER PUBLICATIONS

Addictivetips.com top 10 Android App for Photo Editing as available Jun. 10, 2011, pp. 1-12 https://web.archive.org/web/20110610150220/https://www.addictivetips.com/mobile/top-10-android-apps-for-photo-editing-styling-and-sharing/ (Year: 2011).*

(Continued)

*Primary Examiner* — Scott T Baderman
*Assistant Examiner* — Mario M Velez-Lopez
(74) *Attorney, Agent, or Firm* — Schwegman Lundberg & Woessner, P.A.

(57) ABSTRACT

A method of adjusting visual content. The method comprises selecting, on a client terminal, visual content, extracting visual content data pertaining to the visual content, forwarding a request which includes the visual content data to a network node via a network, receiving, in response to the request, a list of a plurality of visual content editing functions from the network node, presenting, on the client terminal, the plurality of visual content editing functions to a user, receiving a selection of at least one member of the list from the user, adjusting the visual content using the at least one member, and outputting the adjusted visual content.

20 Claims, 3 Drawing Sheets

Related U.S. Application Data continuation of application No. 17/224,973, filed on Apr. 7, 2021, now Pat. No. 11,451,856, which is a continuation of application No. 16/538,397, filed on Aug. 12, 2019, now Pat. No. 10,999,623, which is a continuation of application No. 15/974,409, filed on May 8, 2018, now Pat. No. 10,440,420, which is a continuation of application No. 15/250,960, filed on Aug. 30, 2016, now Pat. No. 10,334,307, which is a continuation of application No. 14/232,274, filed as application No. PCT/IL2012/050242 on Jul. 10, 2012, now Pat. No. 9,459,778.

(60) Provisional application No. 61/506,670, filed on Jul. 12, 2011.

(51) Int. Cl.
| | | |
|---|---|---|
| *G06F 3/04845* | (2022.01) | |
| *G06T 1/00* | (2006.01) | |
| *G06V 20/40* | (2022.01) | |
| *G11B 27/034* | (2006.01) | |
| *H04M 1/72445* | (2021.01) | |
| *H04N 5/44* | (2011.01) | |
| *H04N 21/234* | (2011.01) | |
| *H04N 21/414* | (2011.01) | |
| *H04N 21/4223* | (2011.01) | |
| *H04N 21/431* | (2011.01) | |
| *H04N 21/45* | (2011.01) | |
| *H04N 21/472* | (2011.01) | |
| *H04N 21/4788* | (2011.01) | |
| *H04N 23/63* | (2023.01) | |
| *H04L 51/52* | (2022.01) | |
| *H04M 1/72457* | (2021.01) | |

(52) U.S. Cl.
CPC ............ *G06F 40/30* (2020.01); *G06T 1/0007* (2013.01); *G06V 20/46* (2022.01); *G11B 27/034* (2013.01); *H04M 1/72445* (2021.01); *H04N 5/44* (2013.01); *H04N 21/23418* (2013.01); *H04N 21/41407* (2013.01); *H04N 21/4223* (2013.01); *H04N 21/4524* (2013.01); *H04N 21/47205* (2013.01); *H04N 21/4788* (2013.01); *H04N 23/63* (2023.01); *H04L 51/52* (2022.05); *H04M 1/72457* (2021.01); *H04M 2250/52* (2013.01)

(58) Field of Classification Search
CPC ........... H04N 21/4223; H04N 21/4524; H04N 21/47205; H04N 21/4788; G06F 40/30; G06F 3/0482; G06F 3/04845; H04M 1/72445; H04M 1/72457; H04M 2250/52; G06V 20/46; G06T 1/0007; G11B 27/034; H04L 51/52; H04L 51/32
See application file for complete search history.

(56) References Cited

U.S. PATENT DOCUMENTS

| | | |
|---|---|---|
| 4,581,634 A | 4/1986 | Williams |
| 4,975,690 A | 12/1990 | Torres |
| 5,072,412 A | 12/1991 | Henderson, Jr. et al. |
| 5,347,627 A | 9/1994 | Hoffmann et al. |
| 5,493,692 A | 2/1996 | Theimer et al. |
| 5,581,670 A | 12/1996 | Bier et al. |
| 5,617,114 A | 4/1997 | Bier et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,484,196 B1 | 11/2002 | Maurille |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,027,663 B2 * | 4/2006 | Edwards ............ G06F 3/04845 358/464 |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,269,426 B2 | 9/2007 | Kokkonen et al. |
| 7,280,658 B2 | 10/2007 | Amini et al. |
| 7,304,677 B2 | 12/2007 | Keelan et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,391,929 B2 | 6/2008 | Edwards et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,508,419 B2 | 3/2009 | Toyama et al. |

(56) References Cited

U.S. PATENT DOCUMENTS

| | | |
|---|---|---|
| 7,512,649 B2 | 3/2009 | Faybishenko et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,814,089 B1 | 10/2010 | Skrenta et al. |
| 7,856,360 B2 | 12/2010 | Kramer et al. |
| 8,001,204 B2 | 8/2011 | Burtner et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,250,473 B1 * | 8/2012 | Haynes ............... H04L 43/0876 709/224 |
| 8,266,524 B2 * | 9/2012 | Bailey .................. G06F 40/143 715/240 |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,471,914 B2 | 6/2013 | Sakiyama et al. |
| 8,472,935 B1 | 6/2013 | Fujisaki |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,594,680 B2 | 11/2013 | Ledlie et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,788,943 B2 * | 7/2014 | Borst ..................... H04L 51/04 715/764 |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,725 B1 | 12/2014 | Sehn |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,030,464 B2 * | 5/2015 | Baxter, III ............ G06T 11/001 345/419 |
| 9,040,574 B2 | 5/2015 | Wang et al. |
| 9,055,416 B2 | 6/2015 | Rosen et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,258,459 B2 | 2/2016 | Hartley |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,507,819 B2 * | 11/2016 | Gross ................ G06F 16/24578 |
| 9,532,171 B2 | 12/2016 | Allen et al. |
| 9,537,811 B2 | 1/2017 | Allen et al. |
| 9,628,950 B1 | 4/2017 | Noeth et al. |
| 9,710,821 B2 | 7/2017 | Heath |
| 9,854,219 B2 | 12/2017 | Sehn |
| 10,334,307 B2 | 6/2019 | Hogeg et al. |
| 10,440,420 B2 | 10/2019 | Hogeg et al. |
| 10,999,623 B2 | 5/2021 | Hogeg et al. |
| 11,451,856 B2 | 9/2022 | Hogeg et al. |
| 11,750,875 B2 | 9/2023 | Hogeg et al. |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |

(56) References Cited

U.S. PATENT DOCUMENTS

| | | |
|---|---|---|
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0271300 A1 | 12/2005 | Pina |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1* | 11/2007 | Funayama ............. H04N 23/76 348/E5.041 |
| 2007/0271521 A1 | 11/2007 | Harriger et al. |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0058006 A1 | 3/2008 | Ladouceur |
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0119710 A1 | 5/2009 | Lo et al. |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0259949 A1 | 10/2009 | Verlaan et al. |
| 2009/0265647 A1 | 10/2009 | Martin et al. |
| 2009/0288022 A1* | 11/2009 | Almstrand ............ G06F 9/451 715/762 |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0080551 A1 | 4/2010 | Chen et al. |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0120453 A1 | 5/2010 | Tamchina et al. |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |

(56) References Cited

U.S. PATENT DOCUMENTS

| | | |
|---|---|---|
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0012929 A1 | 1/2011 | Grosz et al. |
| 2011/0026898 A1 | 2/2011 | Lussier et al. |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0231288 A1 | 9/2011 | Crisan |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0066573 A1* | 3/2012 | Berger ............... H04N 1/00196 715/202 |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1* | 5/2012 | Alcazar ............... H04L 67/51 707/741 |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1* | 11/2012 | Garcia ............... G06F 3/0481 709/204 |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0311434 A1* | 12/2012 | Skrenta ............... G06F 16/954 715/234 |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1* | 4/2013 | Garcia ............... H04W 4/21 455/456.3 |
| 2013/0102328 A1 | 4/2013 | Kalofonos et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0167087 A1* | 6/2013 | Tighe ............... G06F 3/0481 715/811 |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0262568 A1* | 10/2013 | Raffel ............... H04L 67/55 709/203 |

(56) References Cited

U.S. PATENT DOCUMENTS

| | | |
|---|---|---|
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0332379 A1 | 12/2013 | Hayes et al. |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0129981 A1* | 5/2014 | Soderberg .............. G06F 3/0482 715/810 |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0201227 A1* | 7/2014 | Hamilton-Dick ... G06F 16/9535 707/758 |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2014/0372369 A1* | 12/2014 | Babanov ............. G06F 16/1767 707/608 |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |
| 2015/0172534 A1 | 6/2015 | Miyakawa et al. |
| 2015/0178260 A1 | 6/2015 | Brunson |
| 2015/0222814 A1 | 8/2015 | Li et al. |
| 2015/0261917 A1 | 9/2015 | Smith |
| 2015/0312184 A1 | 10/2015 | Langholz et al. |
| 2015/0350136 A1 | 12/2015 | Flynn, III et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0085773 A1 | 3/2016 | Chang et al. |
| 2016/0085863 A1 | 3/2016 | Allen et al. |
| 2016/0099901 A1 | 4/2016 | Allen et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0239248 A1 | 8/2016 | Sehn |
| 2016/0277419 A1 | 9/2016 | Allen et al. |
| 2016/0321708 A1 | 11/2016 | Sehn |
| 2016/0373805 A1 | 12/2016 | Hogeg et al. |
| 2017/0006094 A1 | 1/2017 | Abou Mahmoud et al. |
| 2017/0053365 A1* | 2/2017 | Koch ................... G06Q 50/184 |
| 2017/0061308 A1 | 3/2017 | Chen et al. |
| 2017/0070462 A1* | 3/2017 | Lee ......................... H04L 51/04 |
| 2017/0287006 A1 | 10/2017 | Azmoodeh et al. |
| 2018/0113587 A1* | 4/2018 | Allen ..................... G06V 20/47 |
| 2018/0255345 A1 | 9/2018 | Hogeg et al. |
| 2019/0364328 A1 | 11/2019 | Hogeg et al. |
| 2021/0227284 A1 | 7/2021 | Hogeg et al. |
| 2022/0368978 A1 | 11/2022 | Hogeg et al. |

FOREIGN PATENT DOCUMENTS

| | | |
|---|---|---|
| EP | 2151797 A1 | 2/2010 |
| EP | 2315167 A1 | 4/2011 |
| EP | 2732383 B1 | 4/2018 |
| EP | 3288275 B1 | 12/2021 |
| GB | 2399928 A | 9/2004 |
| IL | 300140 | 3/2023 |
| KR | 19990073076 A | 10/1999 |
| KR | 20010078417 A | 8/2001 |
| WO | WO-1996024213 A1 | 8/1996 |
| WO | WO-1999063453 A1 | 12/1999 |
| WO | WO-2000058882 A1 | 10/2000 |
| WO | WO-0129642 A1 | 4/2001 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2008043143 A1 | 4/2008 |
| WO | WO-2009043020 A2 | 4/2009 |
| WO | WO-2011040821 A1 | 4/2011 |
| WO | WO-2011119407 A1 | 9/2011 |
| WO | WO-2013008238 A1 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |

OTHER PUBLICATIONS addictivetips.com, Top 10 Android Apps For Photo Editing, Styling And Sharing, [Online] retrieved from the internet: <http://www.addictivetips.com/mobile/top-10-android-apps-for-photo-editing-styling-and-sharing/>, (Jun. 20, 2011), 1-12.

"A Whole New Story", Snap, Inc., [Online] Retrieved from the Internet: <URL: https://www.snap.com/en-US/news/>, (2017), 13 pgs.

"Addictivetips.com top 10 Android App for Photo Editing", <http:/Avww.addictivetips.com/mobile/top-1 0-android-apps-for-photo-editing-styling-and-sharing=UTF-8 />, (Jun. 10, 2011), 1-12.

(56) References Cited

OTHER PUBLICATIONS

"Adding photos to your listing", eBay, [Online] Retrieved from the Internet: <URL: http://pages.ebay.com/help/sell/pictures.html>, (accessed May 24, 2017), 4 pgs.

"U.S. Appl. No. 14/232,274, Final Office Action mailed Mar. 25, 2016", 18 pgs.

"U.S. Appl. No. 14/232,274, Non Final Office Action mailed Sep. 14, 2015", 16 pgs.

"U.S. Appl. No. 14/232,274, Notice of Allowance mailed Jun. 13, 2016", 7 pgs.

"U.S. Appl. No. 14/232,274, Preliminary Amendment filed Jan. 12, 2014", 8 pgs.

"U.S. Appl. No. 14/232,274, Response filed May 4, 2016 to Final Office Action mailed Mar. 25, 2016", 13 pgs.

"U.S. Appl. No. 14/232,274, Response filed Dec. 10, 2015 to Non Final Office Action mailed Sep. 14, 2015", 11 pgs.

"U.S. Appl. No. 15/250,960, Corrected Notice of Allowability mailed Apr. 25, 2019", 2 pgs.

"U.S. Appl. No. 15/250,960, Non Final Office Action mailed Jul. 5, 2018", 16 pgs.

"U.S. Appl. No. 15/250,960, Non Final Office Action mailed Oct. 30, 2017", 15 pgs.

"U.S. Appl. No. 15/250,960, Notice of Allowance mailed Jan. 17, 2019", 7 pgs.

"U.S. Appl. No. 15/250,960, Notice of Allowance mailed Mar. 14, 2018", 10 pgs.

"U.S. Appl. No. 15/250,960, Response filed Jan. 30, 2018 to Non Final Office Action mailed Oct. 30, 2017", 16 pgs.

"U.S. Appl. No. 15/250,960, Response filed Oct. 4, 2018 to Non Final Office Action mailed Jul. 5, 2018", 14 pgs.

"U.S. Appl. No. 15/974,409, Corrected Notice of Allowability mailed Jul. 22, 2019", 2 pgs.

"U.S. Appl. No. 15/974,409, Non Final Office Action mailed Jun. 22, 2018", 13 pgs.

"U.S. Appl. No. 15/974,409, Non Final Office Action mailed Oct. 12, 2018", 12 pgs.

"U.S. Appl. No. 15/974,409, Notice of Allowance mailed May 17, 2019", 7 pgs.

"U.S. Appl. No. 15/974,409, PTO Response to Rule 312 Communication mailed Aug. 23, 2019", 2 pgs.

"U.S. Appl. No. 15/974,409, Response filed Jan. 14, 2019 to Non Final Office Action mailed Oct. 12, 2018", 14 pgs.

"U.S. Appl. No. 15/974,409, Response filed Sep. 21, 2018 to Non Final Office Action mailed Jun. 22, 2018", 12 pgs.

"U.S. Appl. No. 16/538,397, Corrected Notice of Allowability mailed Feb. 3, 2021", 3 pgs.

"U.S. Appl. No. 16/538,397, Examiner Interview Summary mailed Dec. 15, 2020", 3 pgs.

"U.S. Appl. No. 16/538,397, Non Final Office Action mailed Sep. 4, 2020", 18 pgs.

"U.S. Appl. No. 16/538,397, Notice of Allowance mailed Jan. 6, 2021", 7 pgs.

"U.S. Appl. No. 16/538,397, Response filed Dec. 2, 2020 to Non Final Office Action mailed Sep. 4, 2020", 10 pgs.

"U.S. Appl. No. 17/224,973, 312 Amendment filed Jul. 27, 2022", 6 pgs.

"U.S. Appl. No. 17/224,973, Corrected Notice of Allowability mailed May 19, 2022", 2 pgs.

"U.S. Appl. No. 17/224,973, Examiner Interview Summary mailed Jan. 21, 2022", 2 pgs.

"U.S. Appl. No. 17/224,973, Non Final Office Action mailed Oct. 13, 2021", 14 pgs.

"U.S. Appl. No. 17/224,973, Notice of Allowance mailed May 4, 2022", 7 pgs.

"U.S. Appl. No. 17/224,973, PTO Response to Rule 312 Communication mailed Aug. 10, 2022", 2 pgs.

"U.S. Appl. No. 17/224,973, Response filed Jan. 13, 2022 to Non Final Office Action mailed Oct. 13, 2021", 9 pgs.

"U.S. Appl. No. 17/879,424, Non Final Office Action mailed Jan. 9, 2023", 9 pgs.

"U.S. Appl. No. 17/879,424, Notice of Allowance mailed Apr. 18, 2023", 8 pgs.

"U.S. Appl. No. 17/879,424, Response filed Apr. 5, 2023 to Non Final Office Action mailed Jan. 9, 2023", 8 pgs.

"BlogStomp", StompSoftware, [Online] Retrieved from the Internet: <URL: http://stompsoftware.com/blogstomp>, (accessed May 24, 2017), 12 pgs.

"Brazilian Application Serial No. 112014000615-6, Office Action mailed Oct. 29, 2019", w/o English Translation, 5 pgs.

"Brazilian Application Serial No. 112014000615-6, Response filed Feb. 7, 2020 to Office Action mailed Oct. 29, 2019", w/ Concise Statement of Relevance, 86 pgs.

"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.

"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.

"Dear All Photo Apps: Mobli Just Won Filters", [Online] Retrieved from the Internet: <URL: http://techcrunch.com/2011/09/08/mobli-filters/>, (Sep. 8, 2011), 8 pgs.

"European Application Serial No. 12811671.2, Communication Pursuant to Article 94(3) EPC mailed Jan. 2, 2017", 8 pgs.

"European Application Serial No. 12811671.2, Extended European Search Report mailed Feb. 4, 2015", 8 pgs.

"European Application Serial No. 12811671.2, Response filed May 12, 2017 to Communication Pursuant to Article 94(3) EPC mailed Jan. 2, 2017", 11 pgs.

"European Application Serial No. 12811671.2, Response filed Aug. 26, 2015 to Extended European Search Report mailed Feb. 4, 2015", 15 pgs.

"European Application Serial No. 17196636.9, Communication Pursuant to Article 94(3) EPC mailed May 31, 2019", 8 pgs.

"European Application Serial No. 17196636.9, Extended European Search Report mailed Nov. 7, 2017", 7 pgs.

"European Application Serial No. 17196636.9, Response filed Mar. 26, 2021 to Summons to Attend Oral Proceedings mailed Dec. 1, 2020", 23 pgs.

"European Application Serial No. 17196636.9, Response filed Dec. 9, 2019 to Communication Pursuant to Article 94(3) EPC mailed May 31, 2019", 14 pgs.

"European Application Serial No. 17196636.9, Summons to Attend Oral Proceedings mailed Dec. 1, 2020", 11 pgs.

"European Application Serial No. 21218404.8, Extended European Search Report mailed Mar. 14, 2022", 11 pgs.

"Instagram: Beautiful Photo Editing and Sharing App for iPhone", MakeUseOf, Retrieved From the Internet, (Oct. 15, 2010).

"InstaPlace Photo App Tell The Whole Story", [Online] Retrieved from the Internet: <URL: youtu.be/uF_gFkg1hBM>, (Nov. 8, 2013), 113 pgs.; 1:02 min.

"International Application Serial No. PCT/IL2012/050242, International Preliminary Report on Patentability mailed Jan. 23, 2014", 7 pgs.

"International Application Serial No. PCT/IL2012/050242, International Search Report mailed Nov. 9, 2012", 2 pgs.

"International Application Serial No. PCT/IL2012/050242, Written Opinion mailed Nov. 9, 2012", 5 pgs.

"International Application Serial No. PCT/US2015/037251, International Search Report mailed Sep. 29, 2015", 2 pgs.

"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.

"Israel Application Serial No. 230366, Office Action mailed Mar. 16, 2017", 2 pgs.

"Israel Application Serial No. 230366, Office Action mailed Sep. 7, 2015", 2 pgs.

"Israel Application Serial No. 255797, Office Action mailed Jan. 20, 2020", w/ English Translation, 7 pgs.

"Israel Application Serial No. 255797, Office Action mailed Oct. 21, 2018", w/ English translation, 8 pgs.

(56) References Cited

OTHER PUBLICATIONS

"Israel Application Serial No. 255797, Response Filed Feb. 12, 2019 to Office Action mailed Oct. 21, 2018", w/English Claims, 25 pgs.
"Israel Application Serial No. 255797, Response filed May 20, 2020 to Office Action mailed Jan. 20, 2020", w/ English Claims, 15 pgs.
"Israel Application Serial No. 282379, Office Action mailed Oct. 28, 2021", w/ English Translation, 7 pgs.
"Israel Application Serial No. 282379, Response filed Feb. 23, 2022 to Office Action mailed Oct. 28, 2021", w/English claims, 13 pgs.
"Israel Application Serial No. 300140, Notification Prior to Examination mailed Jan. 25, 2023", w/ English Translation, 4 pgs.
"Israeli Application Serial No. 230366, Response filed Jul. 16, 2017 to Office Action mailed Mar. 16, 2017", 37 pgs.
"Israeli Application Serial No. 255797, Notification Prior to Examination mailed Nov. 23, 2017", with English Translation, 6 pgs.
"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.
"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.
"Mexican Application Serial No. MX/a/2014/000392, Office Action mailed Dec. 12, 2014", 3 pgs.
"Mexican Application Serial No. MX/a/2014/000392, Response filed Apr. 16, 2015 to Office Action mailed Dec. 12, 2014", 15 pgs.
"Starbucks Cup Magic", [Online] Retrieved from the Internet: <URL: https://www.youtube.com/watch?v=RWwQXi9RGOw>, (Nov. 8, 2011), 87 pgs.; 00:47 min.
"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.
"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.
Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.
Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.
Ken, Mcmahon, et al., Paint Shop Pro 9, [Online] retrieved from the internet: <http://academic.safaribooksonline.com/book/photo-and-graphic-manipulation/9780240519814>, (Mar. 22, 2005), 1-4.
Khan, Sameed, "Top 10 Android Apps For Photo Editing, Styling And Sharing", URL: https://www.addictivetips.com/mobile/top-10-android-apps-for-photo-editing-styling-and-sharing/, (Jun. 7, 2011), 12 pgs.
Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.
Macleod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.
Notopoulos, Katie, "A Guide To The New Snapchat Filters And Big Fonts", [Online] Retrieved from the Internet: <URL: https://www.buzzfeed.com/katienotopoulos/a-guide-to-the-new-snapchat-filters-and-big-fonts?utm_term =.bkQ9qVZWe#.nv58YXpkV>, (Dec. 22, 2013), 13 pgs.
Panzarino, Matthew, "Snapchat Adds Filters, A Replay Function And For Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.
Tripathi, Rohit, "Watermark Images in PHP And Save File on Server", [Online] Retrieved from the Internet: <URL: http://code.rohitink.com/2012/12/28/watermark-images-in-php-and-save-file-on-server>, (Dec. 28, 2012), 4 pgs.
"Israel Application Serial No. 306019, Notification of Defects in Patent Application mailed Apr. 18, 2024", English Translation, 3 pgs.
"Israel Application Serial No. 306019, Notification Prior to Examination mailed Oct. 9, 2023", w/ English Translation, 4 pgs.

\* cited by examiner

PROVIDING VISUAL CONTENT EDITING FUNCTIONS

RELATED APPLICATIONS

This application is a continuation of and claims the benefit of priority of U.S. patent application Ser. No. 17/879,424, filed Aug. 2, 2022, which application is a continuation of and claims the benefit of priority of U.S. patent application Ser. No. 17/224,973, filed on Apr. 7, 2021, which is a continuation of and claims the benefit of priority of U.S. patent application Ser. No. 16/538,397, filed on Aug. 12, 2019, which is a continuation of and claims the benefit of priority of U.S. patent application Ser. No. 15/974,409, filed on May 8, 2018, which is a continuation of and claims the benefit of priority of U.S. patent application Ser. No. 15/250,960, filed on Aug. 30, 2016, which is a continuation of and claims the benefit of priority of U.S. patent application Ser. No. 14/232,274, filed on Jan. 12, 2014, which is a National Phase of PCT Patent Application Serial No. PCT/IL2012/050242, filed on Jul. 10, 2012, which claims the benefit of priority of U.S. Provisional Patent Application Ser. No. 61/506,670, filed on Jul. 12, 2011. The contents of the above applications are all incorporated by reference as if fully set forth herein in their entireties.

FIELD AND BACKGROUND OF THE INVENTION

The present invention, in some embodiments thereof, relates to image processing and, more particularly, but not exclusively, to systems and methods of selectively adjusting visual content on client terminals.

Emerging telecommunications services enable client terminals, such as handheld devices, i.e. cell phones and tablets to exchange data containers of different types and/or to post these data containers in a content sharing platform. For example, a data container may include data representing a text segment, an image, an audio signal, and/or a video signal.

For example, Twitter™ offers a social networking and microblogging service. enabling its users to send and read messages, also referred to as tweets. Tweets are text-based posts of up to 140 characters displayed on the user's profile page.

Other examples include real-time visual media sharing platforms which allow a user to share with his friends an image he or she captured, for example in a social network such as Facebook™ and/or other users of the real-time visual media sharing platforms. Examples of such real-time visual media sharing platforms are Mobli™, Instagram™, and Twitter™.

Some of these real-time visual media sharing platforms suggest functions that allow the user to edit the shared image, for example using color filters and/or the like.

SUMMARY OF THE INVENTION

According to some embodiments of the present invention, there is provided a method of selecting visual content editing functions, The method comprises storing a plurality of records each with suitability data of one of a plurality of visual content editing functions, receiving, from a client terminal, a request with visual content data pertaining to a visual content, selecting a group from the plurality of visual content editing functions according to the visual content data, and responding to the request of the client terminal by sending a response with a list which comprises at least one of a plurality of members of the group and a plurality of indications for the plurality of members.

Optionally, the method further comprises capturing the visual content using an image sensor installed in the client terminal.

Optionally, the visual content data comprises positional data pertaining to the client terminal, the selecting being performed according to the positional data.

More optionally, the selecting comprises using the positional data to classify the location of the client terminal, the selecting being performed according to the classification.

Optionally, the visual content data comprises a velocity of the client terminal, the selecting being performed according to the velocity.

Optionally, the method further comprises analyzing textual content a plurality of content providing network sources to identify at least one current event, the selecting being performed according to the at least one current event.

More optionally, the analyzing comprises at least one of a semantic analysis and a statistic analysis of the textual content.

More optionally, the method further comprises acquiring at least one demographic characteristic of a user of the client terminal; wherein the selecting is performed according to the at least one demographic characteristic.

More optionally, the storing comprises automatically generating at least some of the plurality of visual content editing functions according to at least one of the visual content data, personal data pertaining to a user of the client terminal, and information acquired from textual content a plurality of content providing network sources.

Optionally, the request comprises user identification, the selecting comprises acquiring personal data pertaining to a user of the client terminal according to the user identification, the selecting being performed according to the personal data.

More optionally, the personal data being extracted from a social network profile.

More optionally, the personal data comprises a log of previously selected visual content editing functions from the plurality of visual content editing functions.

More optionally, the request comprises user identification, the selecting comprises acquiring social network data pertaining to a friend of a user of the client terminal in a social network according to the user identification, the selecting being performed according to the social network data.

According to some embodiments of the present invention, there is provided a method of adjusting visual content. The method comprises selecting visual content on a client terminal, extracting visual content data pertaining to the visual content, forwarding a request which includes the visual content data to a network node via a network, receiving, in response to the request, a list of a plurality of visual content editing functions from the network node, presenting, on the client terminal, the plurality of visual content editing functions to a user, receiving a selection of at least one member of the list from the user, adjusting the visual content using the at least one member, and outputting the adjusted visual content.

Optionally, the selecting comprises locally capturing the visual content using an image sensor installed in the client terminal.

Optionally, the selecting comprises accessing a database via the network and selecting the visual content using a user interface on the client terminal.

Optionally, the extracting comprises image processing the visual content to perform at least one of identifying an object having a predefined feature in the visual content, classifying a scene depicted in the visual content, recognizing a facial feature in the visual content, and detecting a moving object in the visual content and the request comprises an outcome of the image processing.

More optionally, the method further comprises identifying positional data of the client terminal; the visual content data comprises the positional data.

Optionally, the request comprises user identification data; further comprising extracting personal data according to the user ID; wherein the list being formed according to the personal data.

Optionally, the adjusting comprises acquiring the at least one member from the network node.

According to some embodiments of the present invention, there is provided a system of providing a plurality of visual content editing functions to a plurality of client terminals. The system comprises a network interface which receives a request having from a client terminal, a repository which stores a plurality of records each with suitability data of one of a plurality of visual content editing functions, and a selection module which selects a group of the plurality of visual content editing functions according to the visual content data and generates a list which comprises at least one of a plurality of members of the group and a plurality of indications for the plurality of members. The network interface sends the list as a response to the request.

Optionally, the system further comprises a plurality of client modules each allows a user to create a visual content editing function and update the repository with the created visual content editing function.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
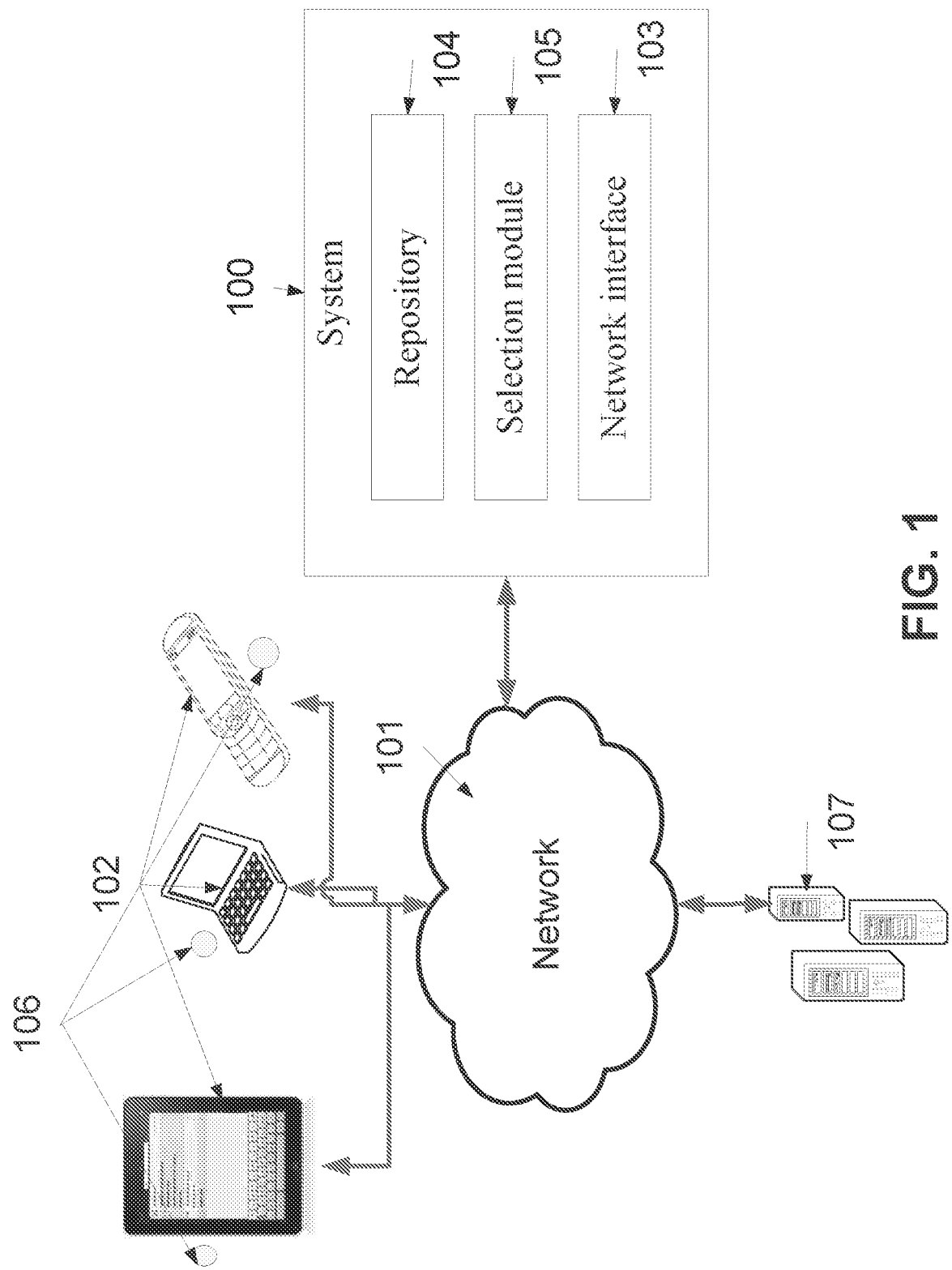
FIG. 1 is a schematic illustration of a system, which is connected via a communication network, to client terminals and provides thereto a list of functions for editing visual content, according to some embodiments of the present invention.

The present invention, in some embodiments thereof, relates to image processing and, more particularly, but not exclusively, to systems and methods of selectively adjusting visual content on client terminals.

According to some embodiments of the present invention, there are methods and systems which provide a remote client terminal with a plurality of visual content editing functions, such as image processing filters and/or overlays, for adjusting a certain visual content based on data extracted therefrom and/or related thereto, real time data, such as news events, and/or personal data related to the user of the client terminal. Optionally, the overlays include sound overlays which are designed to be added to the visual content. The system provides the user with a list of visual content editing functions which are adapted to his needs, preferences and/or to a currently captured visual content. In such a manner, the user is not bound to choose from a fixed set of visual content editing functions and/or has to review a huge collection of visual content editing functions. The selected list exposes the user to different visual content editing functions, which are adapted to his current needs, preferences and/or to a currently captured visual content, such as an image or a video file (i.e. video files, multimedia files, and audio/video files). For example, the system allows a user to receive location based visual content editing functions which allow him to add automatically suitable graphics and/or text by a single click on the presented list. The system further allows a user to receive visual content editing functions which are frequently used by his friends (i.e. social network friends, followers and/or followed users), frequently used by him, and/or suitable to a set of circumstances under which the respective visual content is taken.

Optionally, the system includes a repository with visual content editing functions which are generated in real time according to local and/or global news events and/or visual content editing functions which are generated to meet the needs of any of a plurality of subscribers.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a schematic illustration of a system 100, optionally a network node, which is connected, via a communication network 101, such as the internet, to a plurality of client terminals and provides to these client terminals, optionally in response to a request, a list of functions for editing visual content, such one or more images or video files, according to some embodiments of the present invention. As used herein, editing comprises processing one or more images or frames of a video file, optionally pixel wise, using image filters to filter an image or some or all frames of a video file, adding visual content to an image or one or more frames of a video file, for example graphic elements, adding audible content to an image and/or a video file, overlying or embedding text boxes, overlying or embedding graphical elements, and/or the like, adding frames to a sequence of frames in a video file, and/or the like. For brevity, overlying and embedding may be used herein interchangeably. For brevity, visual content added to the edited visual content is referred to as a visual overlay or overlay. Audible content added to the edited visual content is referred to as a sound overlay.

The system 100 allows users of the client terminals 102 to receive a list of visual content editing functions and to select one or more functions therefrom for editing a selected visual content, such as an image or a video file, for example before the sending and/or the uploading of the visual content, for example as a visual message, for example a visual twit, such as a Mobli™ message, Twitter™ message and/or an Instagram™ message. As used herein, a client terminal means, a mobile telephone, a Smartphone, a tablet, a laptop, a camera having a network interface and/or the like.

The system 100, which is optionally implemented using one or more network servers, includes a network interface 103, such as network interface card and/or a port. The network interface facilitates the establishing of bidirectional communication between the system 100 and the client terminals 102. This communication allows the system 100 to receive requests for visual content editing functions and to respond with a list of selected visual content editing functions, for example as described below.

The system 100 further includes a repository 104 for hosting the visual content editing function records, optionally associated with the visual content editing functions and a selection module 105 which receives the request for visual content editing functions via the network interface 103 and generates a list of visual content editing functions according to request, for example as described below. The list is optionally forwarded to the client terminals via the network interface 103.

Optionally, each client terminal 102 hosts a local module 106, such as an app, a widget, or an add on, with a user interface, for example a graphical user interface (GUI), that presents the user with the option to select visual content for adaptation. For example, the client terminal allows the user to select a file from the memory of the client terminal, a social network profile, an image repository account, such as flicker, and/or the like. Additionally or alternatively, the user interface is adapted to allow the user to send an image or a video taken using the client terminal for processing by one of the plurality of visual content editing functions. For example, the client terminal is a cellular device having an image sensor and a user interface that allows a user to select a member of a list of visual content editing functions which are presented thereto, for example as exemplified below. Optionally, a plurality of user profiles, such as subscriber profiles, are stored and managed the system 100, for example as described below. Optionally, the user profiles are subscriber profiles of a social network, which are managed by a subscriber database, for example managed by separate web servers 107 and/or in a local repository.

Figure 2A:
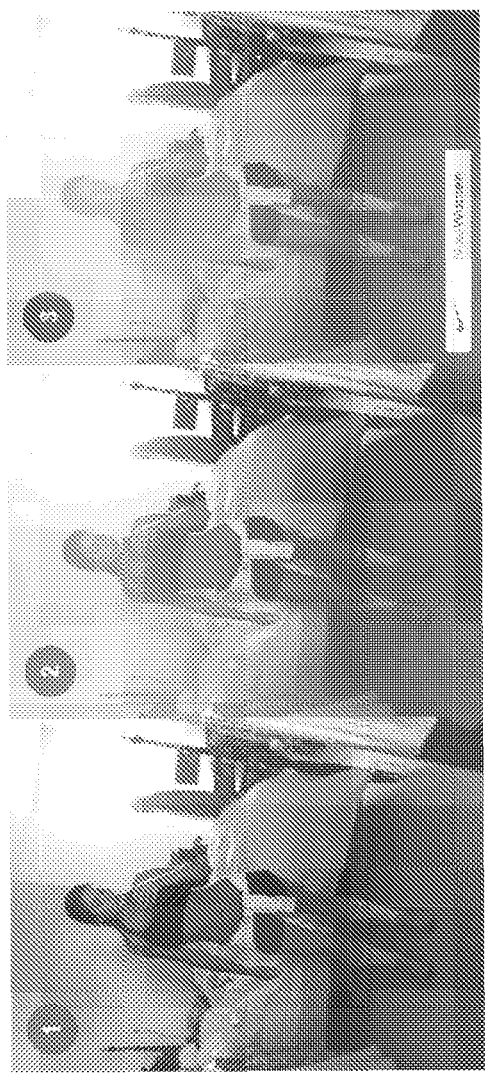
FIGS. 2A and 2B are sets of images where each set includes an original image, a color filtered image, and a color filtered image with an overlay addition of the Nike™ logo, according to some embodiments of the present invention.
Figure 2B:
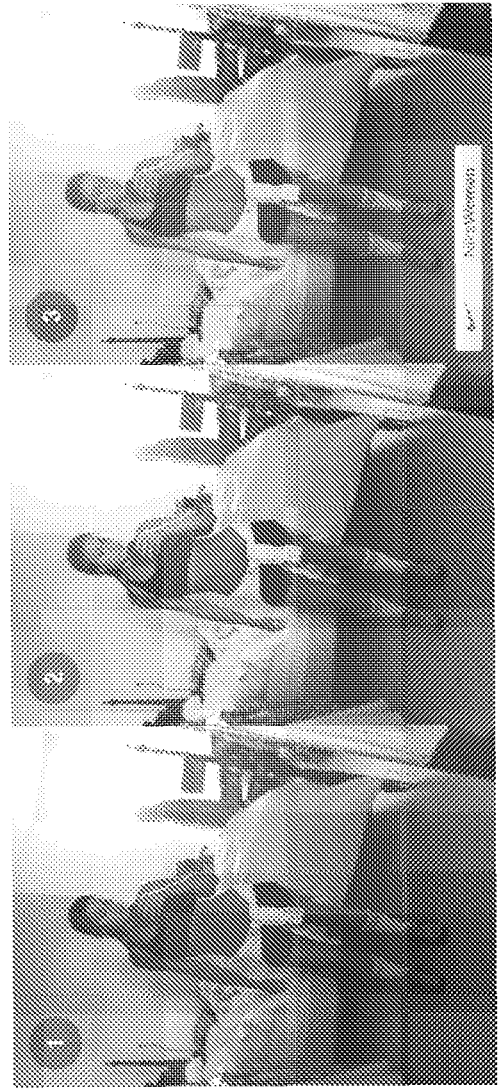

According to some embodiments of the present invention, users may generate visual content editing functions. These visual content editing functions are than uploaded to the repository 104 and a respective documenting record is formed. Optionally, the user defines the sharing of the visual content editing functions. For example, the user defines whether the visual content editing functions are for personal use only, for friends use, and/or for public use. In such embodiments, the visual content editing functions may be tagged with their sharing rights. Optionally, the local module 106 includes visual content editing functions generation module. The generated functions may be customized overlays with selected graphic, color filter with selected colors, and/or any other filters which are planned by the user. For example, each one of FIGS. 2A and 2B depicts a set of images the first, marked with (1) is the original, the second, marked with (2) is when a color filter is applied, and the third, marked with (3) is when a color filter is applied with an overlay addition of the Nike™ logo. The generated functions may be customized sound overlays with selected tones and/or soundtrack, As used herein, a sound overlay means a soundtrack, a music file, and/or any audible content that is set to be played simultaneously to the presentation of the visual content. For example, the sound overlay may an audible advertisement, optionally personalized, music selected by the uploading user, music selected for the uploading user, for instance using an automatic music selection module, such as Genius™ of Apple™, and/or the like.

Figure 3:
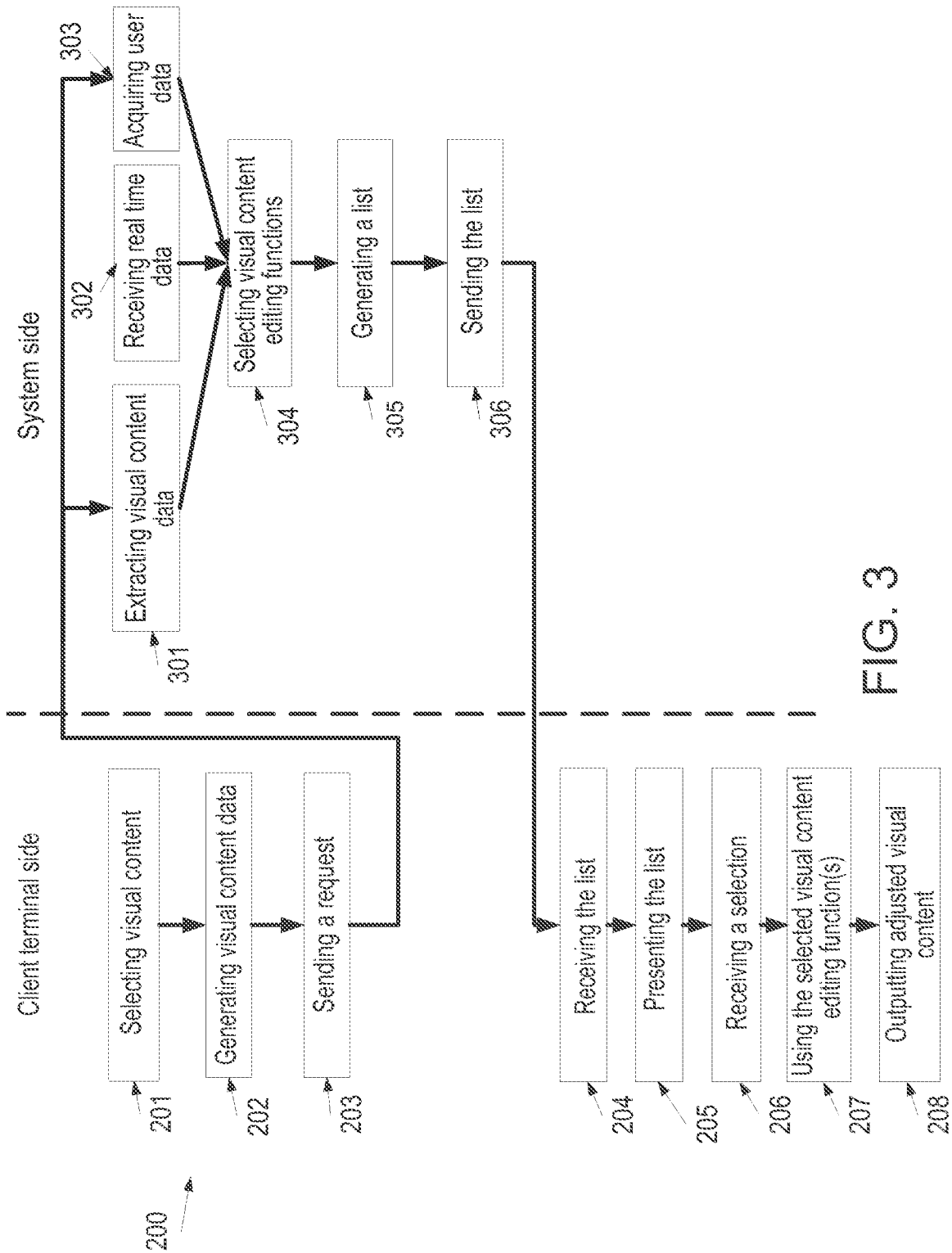
FIG. 3 is a flowchart of a method for processing visual content using one or more visual content editing functions, according to some embodiments of the present invention.

Reference is now made to FIG. 3, which is a flowchart of a method 200 for processing visual content, such as an image or a video file, using one or more visual content editing functions, according to some embodiments of the present invention.

First, as shown at 201, visual content is selected for editing by the user. The selection is optionally performed using a user interface on the client terminal, for example a GUI that is presented on a touch screen of client terminal. The selected visual content may be selected from an internal or an external library or a currently captured image or video file.

Optionally, as shown at 202, visual content data is generated. Optionally, the visual content is locally processed to identify descriptive features that allow classifying depicted scenes and/or characters and/or for identifying certain objects. The image processing may be performed using known image processing algorithms, such as face portion recognition algorithm, a close up detection algorithm, a motion detection algorithm and/or the like. In such an embodiment, the visual content data includes include the descriptive information.

Additionally or alternatively, the visual content data includes positional data pertaining to the location of the client terminal. The positional data, such as location, velocity, and/or acceleration, is optionally acquired from a global positioning system (GPS) unit of the client terminal, assisted GPS, or any other positioning system.

Additionally or alternatively, the visual content data includes information pertaining to the type of the client terminal.

Additionally or alternatively, the visual content data includes user identification (ID) pertaining to the user of the client terminal, for example as described below.

Now, as shown at 203, a request with the visual content data is sent to the system 100, for example as a hypertext transfer protocol (HTTP) message or any other web message.

Optionally, the request includes visual content data pertaining to the selected visual content. The visual content data allows the system 100, for example the selection module 105 to select and/or adapt visual content editing functions to be sent, in response, to the client terminal. For example, at the system side, as shown at FIG. 3, in response to the request from a client terminal, a list of visual content editing functions is generated. First, as shown at 301, the visual content data is extracted from the received request. Additionally or alternatively, as shown at 302, real time is acquired, for example by using web crawlers and/or by accessing selected databases and/or websites for example as described below. Additionally or alternatively, as shown at 303, user data is acquired, for example by accessing social network profiles and/or the aforementioned subscriber database. The user data is acquired with respect to a user ID that is extracted from the request, for example a subscriber ID. This user ID may be provided by the local module 106 and/or from any ID tag of the client terminal.

Now, as shown at 304, based on the visual content data, the real time data, and/or the user data, a plurality of visual content editing functions are selected from the repository 104.

According to some embodiments of the present invention, for example as described above, the visual content data includes positional data. In these embodiments, the positional data is analyzed to select specific location related visual content editing functions.

In such embodiments, some of all of the related visual content editing function records in the repository 104 may be tagged, and optionally weighted, according to their relevancy to a certain geographical area (i.e. coordinates, a country, a city, and a street) and/or location type (i.e. a restaurant, a working place, home, a bar, an amusement park, a train station, a shop, a mall, and a sport venue).

Optionally, each visual content editing function record includes an array of weighted tags (i.e. scored and/or ranked) each given a value according to the affinity of the respective visual content editing function to a different location type and/or geographical area. In use, the user positional data is matched with the array of weighted tags of each one of the visual content editing function records to identify one or more relevant visual content editing functions.

In such a manner, for example, if the positional data is indicative that the visual content was captured in Australia, a visual content editing function which provides an overlay of the Australian flag and/or a sound overlay of the Australian anthem and/or Australian popular music may be selected. In another example, if the positional data is indicative that the visual content was captured in New York, a visual content editing function which provides an overlay of the statue of liberty and/or a sound overlay of the song New York New York may be provided. In another example, if the positional data is indicative that the visual content was captured in a café, a visual content editing function which provides an overlay of a coffee supplier, the café place, and/or café related activities and/or a sound overlay with which is related to café are provided.

According to some embodiments of the present invention, visual content editing functions are selected according to a velocity that is measured for the client terminal. The velocity is optionally part of the positional data, for example as outlined above. Similarly to the above, the visual content editing function records may include one or more tags which are indicative of the relevancy of a respective visual content editing function to one or more velocities. In such a manner, for example, a visual content editing function which may be selected to high velocities may be an overlay with a "road trip" logo, a smear filter for increasing or decreasing a smearing artifact, a suitable soundtrack and/or the like.

According to some embodiments of the present invention, the real time data includes one or more real time events which occurred lately, for example in the last few hours, days, or weeks. Optionally, the real time events are acquired from news aggregators, such as Google™ News, and/or from different websites using web crawlers. Optionally, semantic and/or statistic analysis is used to extract keywords from the news events. Each visual content editing function record is optionally tagged with metadata that includes a plurality of characterizing words or sentences. The keywords may now be matched with the plurality of characterizing words or sentences of each record to determine the relevancy of the respective visual content editing function to the current events. Optionally, visual content editing functions may be uploaded by the operator in response to current events. In such an embodiment, the operator may manually add tag(s) to or update tag(s) of the visual content editing function records, for example with keywords and/or location relevancy data.

The matching between the current events and the visual content editing function records allows selecting visual content editing functions with a real time contemporary meaning. For example, visual content editing functions which are related to the environment, for example overlays with images of Greenpeace logo, images of wild animals, green color filters and/or respective audio may be selected when the current event is "Earth day". In another example, an overlay with a specific slogan is selected. Optionally, a sound overlay wherein the slogan is sound is selected.

Optionally, the real time events are weighted according to the scope of coverage they receive in news websites. These events may be weighted according to their geographical relevance to the user. For example, the real time events are weighted according to the scope of coverage they receive in news websites which handle local matters in proximity to the user. For example, the selection module 105 identifies the current location of the user, for example according to his positional data and weights news events from news websites according to their relevancy to the user location. In such an embodiment, news events from the website sandiego6(dot)com which provides San Diego news from news events of general news websites if the user is located in San Diego.

The matching between positional data of the user and current events and the visual content editing functions allows selecting visual content editing functions which are related to current events in the neighborhood, the city, the country, and/or the area around the user. For example, specific location events such as elections for a local candidate in a U.S. state may be matched for a user that is located in the respective U.S. state with a visual content editing function that is tagged with the candidate's name, such as an overlay with her name. In another example, the location of the user is a stadium and the news indicate that a certain sport match occurs or about to occur in the stadium, visual content editing functions which are related to the playing teams, for example overlays with images of the logo(s) and/or player(s) of the teams, color filters with the colors of the logos of teams, and/or the like may be selected for the user.

According to some embodiments of the present invention, visual content editing functions are selected according to personal information pertaining to the user. Optionally, the system 100 manages a plurality of user profiles, such as subscriber profiles, for example as described above. Each user profile includes personal information pertaining to the user, such as demographic data, visual content editing functions selection history, location positional data history, and/or preferences. In use, the selection module 105 uses the user ID to identify a respective user profile. Additionally or alternatively, the system 100 uses the user ID to extract personal data from his social network page, for example gender, birth date, hometown, education. marital status, and/or interests. The user data from the user profile and/or the social network page is used to select visual content editing functions, for example according to tags in the visual content editing function records, similarly to the described above. In such embodiments, the user consent is optionally acquired.

Additionally or alternatively, the system 100 uses the user ID to extract personal data which defines favorite visual content editing functions. These favorite functions may be top used visual content editing functions, selected and/or tagged visual content editing functions, visual content editing functions which are used to create most of the posted images and/or the like.

In such embodiments, the visual content editing functions are tagged as suitable for users with certain demographic characteristic(s), such as age range, or a certain combination of demographic characteristics, for example age, gender, and marital status. For example, for the age group of between 12 and 17, a visual content editing function of an overlay with an image of Justin Bieber and/or a sound overlay with a song of Justin Bieber may be selected may be selected, for the combination of age and marital status, a visual content editing function of an overlay "I am single" or "I am a proud Mother" can be selected and based on the birth date, a visual content editing function of an overlay with the text "happy birthday", a sound overlay with the song "happy birthday" and/or graphical effect of balloons may be selected.

According to some embodiments of the present invention, visual content editing functions are selected according to the social activity of the user and/or his or her friends. For example, the selection module may access the social network profile to analyze the user's and/or the user's friends news feeds to match visual content editing functions, for example based on a keyword analysis, similarly to the described above regarding news events.

For example, visual content editing functions may be selected according to the user's social activity, such as checking in a certain place, such as a bar, attending a certain event, invited to a certain event, and/or adding indicative content, such as a status line or shared content. Likewise, based on user's friends' preferences may be taken into account when selecting visual content editing functions. For example, if the user profile indicates that the user checked-in a specific restaurant, visual content editing function(s), which are related to restaurants in general and/or to the specific restaurant, are selected. In another example if the user profile indicates that the user has a friend with a birthday, visual content editing function(s), which are related to birthdays in general, are selected.

In another embodiment, visual content editing functions are automatically generated based on the social network profile of the user and/or the selections of friends in his network. For example, a visual content editing function with an overlay that includes a copy of the status of the user may be generated. In another example, if a certain amount of friends of that user chose a specific visual content editing function, this visual content editing function is suggested for the user. In another example, if the user profile indicates that the user has a friend with a birthday, visual content editing function(s), which are related to the specific user who has a birthday, are generated, for example an overlay with the friend's name, a function selected from the most frequent functions he uses and/or the like, Friends' data may be acquired using a social connection graphs.

According to some embodiments of the present invention, visual content editing functions are selected according to previous user selections in the system 100. In such an embodiment, visual content editing functions, which were previously used by the user to enhance visual content, are recorded. This allows weighting visual content editing functions according to their usage prevalence, optionally based on additional forms, such as the location of the user when using the function, the time of the day the user uses the function, and/or the like. In such embodiments, visual content editing functions, which have been selected by the user more than a certain amount of times and/or during a certain time of the day and/or in a certain location, are selected or receive a high score or rank.

For example, if when the user visited in a certain location, for instance the Madison Square Garden, he choose a New York Nicks logo, a function with an overlay of the New York Nicks logo may be selected when the user is back in this location and/or in a similar location, for example in other sport venues.

As described above, a user may create customized visual content editing functions and upload them to the system 100. Optionally, visual content editing functions which are generated by the user and/or his friends, for example social network friends, are selected automatically and/or receive a high ranking in a selection process.

As described above, the visual content data may include descriptive features that allow classifying depicted scenes and/or characters and/or for identifying certain objects. In such an embodiment, visual content editing functions which are tagged as suitable for the descriptive features may be selected. For example, if a car is identified in the visual content, a visual content editing function with an overlay that say "I just pimped my ride" may be selected. If detected a plate or a food portion is identified, a visual content editing function with an overlay and/or a sound overlay that includes promotional content of a food company is presented. In another example, of smiling faces are identified, promotional content to a toothbrush maybe presented.

According to some embodiments of the present invention, the selection module combines some or more of the above methods for selecting visual content editing functions. Optionally, visual content editing functions are ranked or scored by some or all of the aforementioned selection methods. In such a manner, visual content editing functions which receive a cumulative rank or score above a certain threshold and/or a number of visual content editing functions with the top rank and/or score are selected for the list. In such a manner, visual content editing functions are scored according to data acquired from the user's social profile, positional data, and real time data.

Reference is now made, one again, to FIG. 3. Now, as shown at 305, a list which includes the selected visual content editing functions and/or indications of the selected visual content editing functions, for example exemplary thumbnails, is generated and forwarded to the client terminal, as shown at 306.

As shown at 204, the client terminal receives the list of a plurality of visual content editing functions and presents it, as shown at 205, to the user.

The user can now select, as shown at 206, one or more members of the presented list. Optionally, the selected visual content editing functions are stored in the client terminal, for example managed by the local module 106. Additionally or alternatively, the selected visual content editing functions are received in the list. Additionally or alternatively, the visual content editing functions are stored in the repository 104. In such embodiments, after the user selects one or more members, a request for the selected visual content editing functions is forwarded to system 100 which responds with the requested visual content editing functions.

Then, as shown at 207, the visual content is adjusted using the selected visual content editing function(s).

As shown at 208, the adjusted visual content may now be outputted, for example uploaded to a server, posted an/or shared with other subscribers of the system 100, for example as a visual twit, such as a Mobli™ message, Twitter™ message and/or an Instagram™ message, uploaded to a social network webpage and/or forwarded to one or more friends, for example as an electronic message such as an multimedia messaging service (MMS) message.

It is expected that during the life of a patent maturing from this application many relevant methods and/or devices will be developed and the scope of the term a module, a client terminal, and a controller is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A server, comprising:
a memory adapted to store code; and
at least one hardware processor adapted to execute instructions of the code to:
receive, from a client device, a request for one or more visual content editing functions to adjust visual content selected by the client device, the request comprising positional data pertaining to the client device, the positional data comprising one or more velocities;
select, from a plurality of visual content editing functions, a set of visual content editing functions based on at least one velocity from the positional data and based on a set of tags for the set of visual content editing functions, the set of tags indicating relevance of the set of visual content editing functions to a set of velocities, the set of tags being provided by a set of visual content editing function records of the set of visual content editing functions; and cause presentation of the set of visual content editing functions on the client device, the set of visual content editing functions being configured to be selectable by a user using a graphical user interface presented on a display of the client device, at least one of the set of visual content editing functions comprising instructions to generate an overlay to be applied to the visual content in response to a selection made by the user using the graphical user interface.

2. The server of claim 1, wherein at least one visual content editing function, in the set of visual content editing functions, relates to a place proximate to the positional data.

3. The server of claim 1, wherein the visual content comprises at least one of an image and a video file.

4. The server of claim 3, wherein the at least one of the image and the video file is selected from an internal or an external library or captured using an image sensor of the client device.

5. The server of claim 1, wherein the graphical user interface comprises an indication for each visual content editing function in the set of visual content editing functions.

6. The server of claim 1, wherein the overlay to be applied to the visual content comprises at least one of a visual overlay or a sound overlay.

7. The server of claim 1, wherein the set of visual content editing functions comprises a visual content editing function for adjusting the visual content based on extracted data that is extracted from the visual content.

8. The server of claim 7, wherein the extracted data relates to a news event.

9. The server of claim 7, wherein the request comprises the extracted data.

10. A method comprising:

receiving, by at least one hardware processor, a request from a client device, the request being for one or more visual content editing functions to adjust visual content selected by the client device, the request comprising positional data pertaining to the client device, the positional data comprising one or more velocities;

selecting, from a plurality of visual content editing functions and by the at least one hardware processor, a set of visual content editing functions based on at least one velocity from the positional data and based on a set of tags for the set of visual content editing functions, the set of tags indicating relevance of the set of visual content editing functions to a set of velocities, the set of tags being provided by a set of visual content editing function records of the set of visual content editing functions; and causing, by the at least one hardware processor, presentation of the set of visual content editing functions on the client device, the set of visual content editing functions being configured to be selectable by a user using a graphical user interface presented on a display of the client device, at least one of the set of visual content editing functions comprising instructions to generate an overlay to be applied to the visual content in response to a selection made by the user using the graphical user interface.

11. The method of claim 10, wherein at least one visual content editing function, in the set of visual content editing functions, relates to a place proximate to the positional data.

12. The method of claim 10, wherein the visual content comprises at least one of an image and a video file.

13. The method of claim 10, wherein the graphical user interface comprises an indication for each visual content editing function in the set of visual content editing functions.

14. The method of claim 10, wherein the overlay to be applied to the visual content comprises at least one of a visual overlay or a sound overlay.

15. The method of claim 10, wherein the set of visual content editing functions comprises a visual content editing function for adjusting the visual content based on extracted data that is extracted from the visual content.

16. The method of claim 15, wherein the extracted data relates to a news event.

17. The method of claim 15, wherein the request comprises the extracted data.

18. A client device comprising:

a display; and at least one hardware processor adapted to execute code of an application to perform operations comprising:

presenting a graphical user interface on the display;

receive a selection made by a user using the graphical user interface, the selection is indicative of visual content selected by the client device;

sending, to a server, a request for one or more visual content editing functions to adjust the visual content selected by the client device, the request comprising positional data pertaining to the client device, the positional data comprising one or more velocities;

receiving, from the server, a set of visual content editing functions to the client device, the set of visual content editing functions being selected, from a plurality of visual content editing functions, by the server based on at least one velocity from the positional data and based on a set of tags for the set of visual content editing functions, the set of tags indicating relevance of the set of visual content editing functions to a set of velocities, the set of tags being provided by a set of visual content editing function records of the set of visual content editing functions; and adjusting the visual content using at least one visual content editing function from the set of visual content editing functions, the at least one visual content editing function comprising instructions to generate an overlay to be applied to the visual content.

19. The client device of claim 18, wherein the at least one visual content editing function relates to a place proximate to the positional data.

20. The client device of claim 18, wherein the graphical user interface comprises a plurality of indications for each visual content editing function in the set of visual content editing functions.

* * * * *